(12) United States Patent
Tsai et al.

(10) Patent No.: US 10,144,101 B2
(45) Date of Patent: Dec. 4, 2018

(54) HEADSTOCK ASSEMBLY FOR MACHINE TOOL

(71) Applicant: HIWIN TECHNOLOGIES CORP., Taichung (TW)

(72) Inventors: Chien-Hsiang Tsai, Taichung (TW); Chih-Wei Wang, Taichung (TW); Chien-Hung Lai, Taichung (TW); Chung-Sheng Hsu, Taichung (TW)

(73) Assignee: HIWIN TECHNOLOGIES CORPORATION, Taichung (TW)

( * ) Notice: Subject to any disclaimer, the term of this patent is extended or adjusted under 35 U.S.C. 154(b) by 0 days.

(21) Appl. No.: 15/434,926

(22) Filed: Feb. 16, 2017

(65) Prior Publication Data

US 2018/0229336 A1 Aug. 16, 2018

(51) Int. Cl.
| | |
|---|---|
| *B23Q 17/22* | (2006.01) |
| *B23B 25/06* | (2006.01) |
| *B23Q 1/70* | (2006.01) |
| *B23Q 5/42* | (2006.01) |
| *B23Q 1/25* | (2006.01) |
| *B23B 3/06* | (2006.01) |

(52) U.S. Cl.
CPC ............... *B23Q 1/70* (2013.01); *B23Q 5/42* (2013.01); *B23B 3/06* (2013.01); *B23Q 1/25* (2013.01)

(58) Field of Classification Search
CPC .... B23Q 1/25; B23Q 1/28; B23Q 1/70; B23Q 5/42; B23B 3/06
See application file for complete search history.

(56) References Cited

U.S. PATENT DOCUMENTS

| | | | | |
|---|---|---|---|---|
| 4,827,814 | A * | 5/1989 | Wilkins ................. | B23B 3/161 82/1.11 |
| 4,881,309 | A * | 11/1989 | Sansone .................... | B23B 3/30 29/26 A |
| 7,975,897 | B2* | 7/2011 | Semmlinger .......... | B23K 20/12 228/112.1 |
| 2013/0104707 | A1* | 5/2013 | Nakagawa ......... | B23Q 11/0007 82/118 |

FOREIGN PATENT DOCUMENTS

TW M487160 U 10/2014

* cited by examiner

*Primary Examiner* — Sara Addisu
(74) *Attorney, Agent, or Firm* — Foley & Lardner LLP (57) ABSTRACT

A headstock assembly for a machine tool includes a mount having a female threaded bore, a headstock mounted slidably relative to the machine base, a drive member mounted on the headstock, a spindle, and a spindle extension. The spindle has an intermediate segment disposed in a chamber of the headstock and coupled to be driven by the drive member so as to permit the spindle to rotate about a spindle axis. The spindle extension is coupled to be rotatable with the spindle, and has a male threaded segment configured to be in threaded engagement with the female threaded bore so as to permit the headstock to be linearly moved relative to the mount.

9 Claims, 9 Drawing Sheets

HEADSTOCK ASSEMBLY FOR MACHINE TOOL

FIELD

The disclosure relates to a headstock assembly, more particularly to a headstock assembly for a machine tool such as a threading machine.

BACKGROUND

Figure 1:
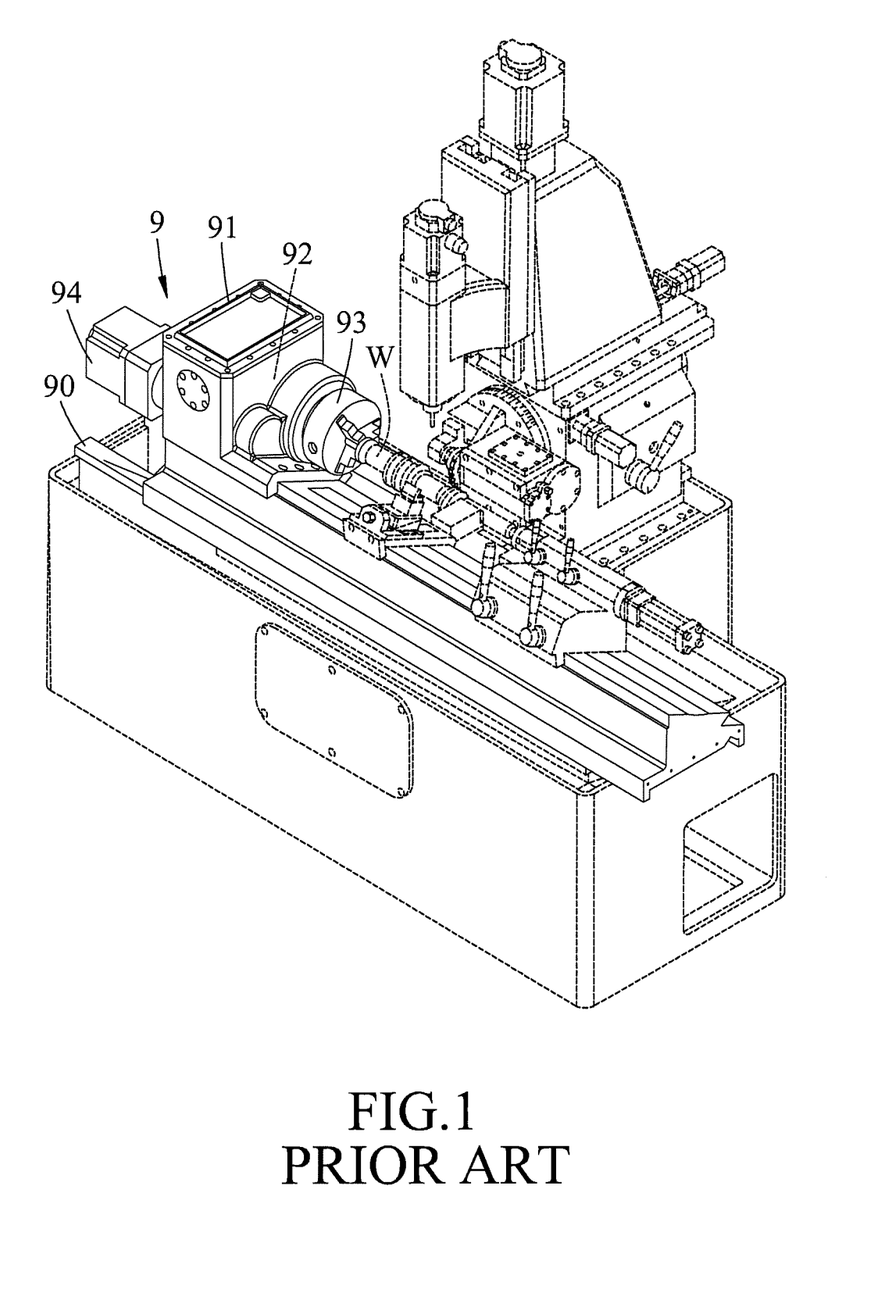
FIG. 1 is a perspective view of a conventional headstock assembly.
Figure 2:
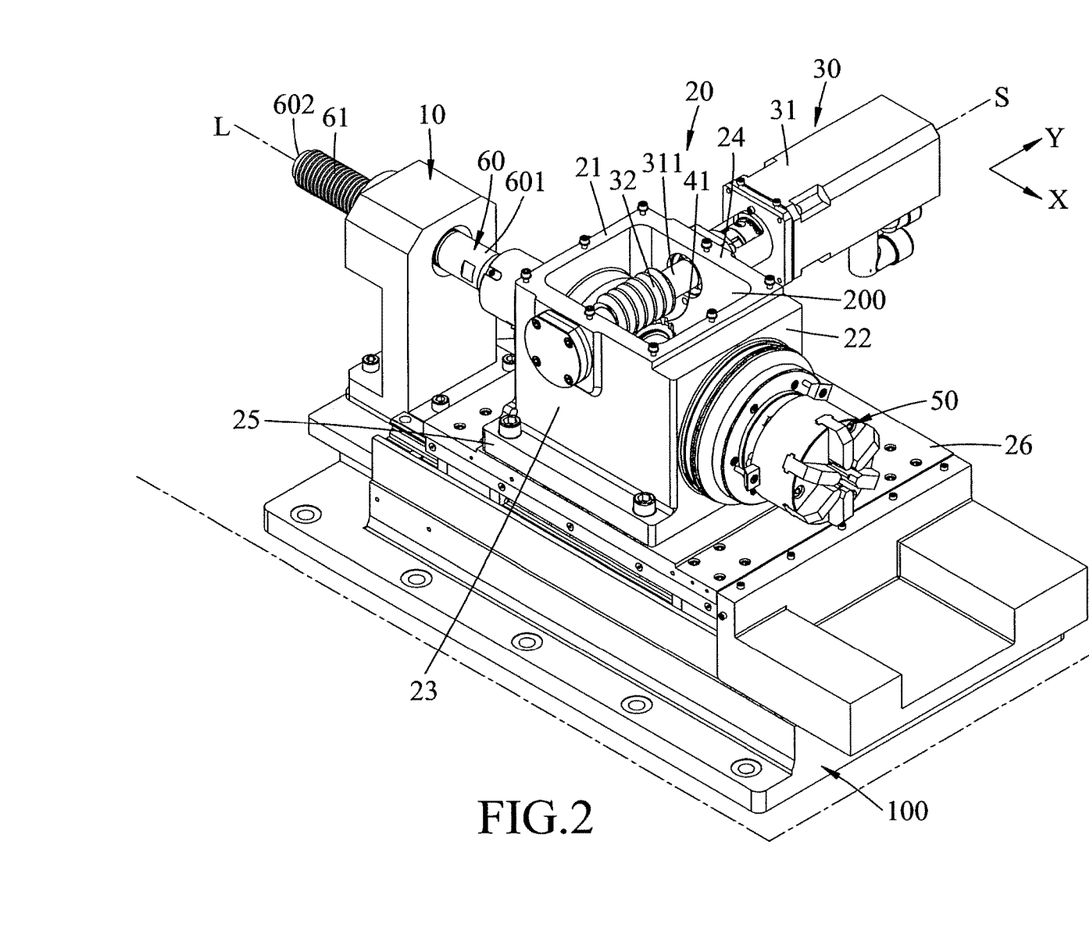
FIG. 2 is a perspective view of a headstock assembly for a machine tool according to a first embodiment of the disclosure.
Figure 3:
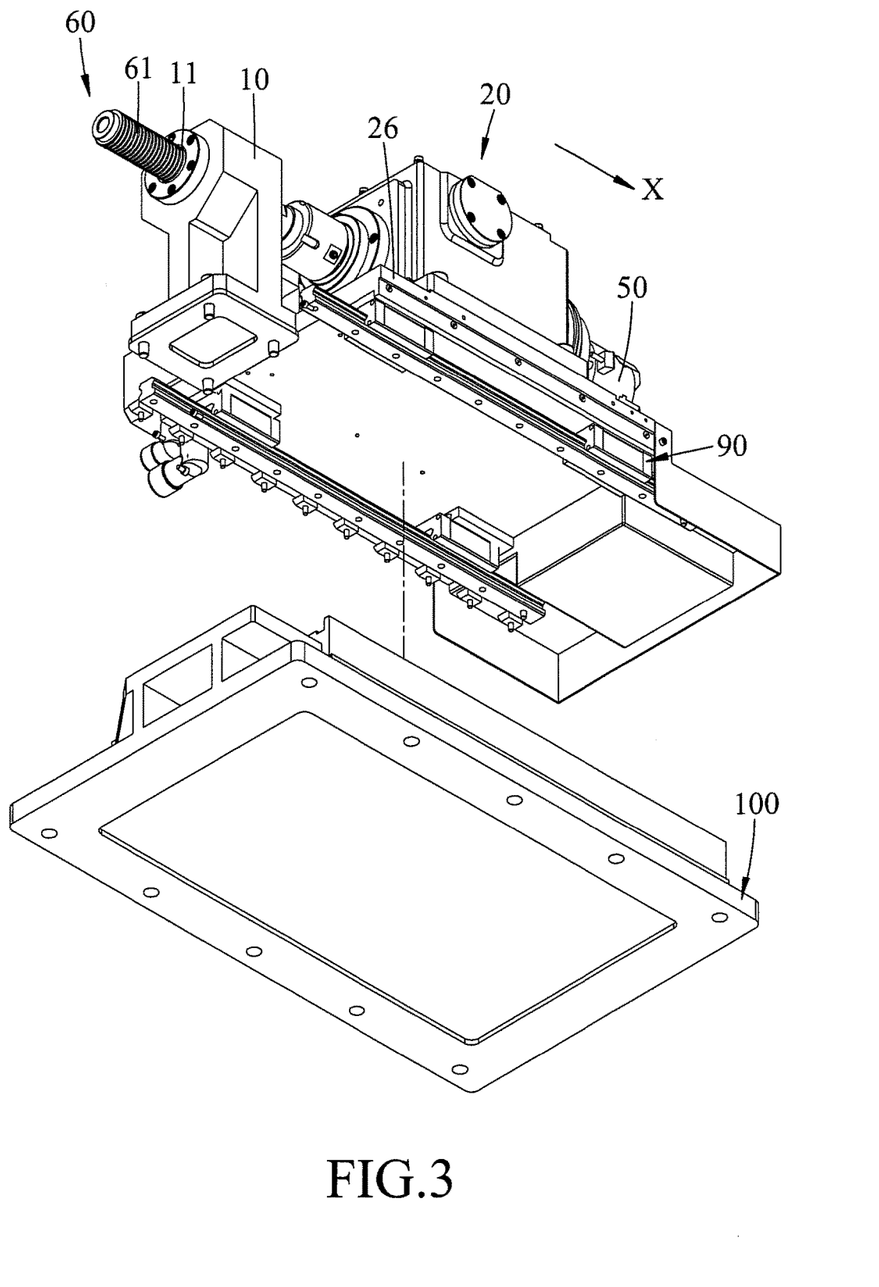
FIG. 3 is a bottom view of the headstock assembly.

Taiwanese utility model patent no. M487160 discloses a conventional headstock assembly 9 for a threading machine (see FIG. 1) in which a headstock 91 is slidably mounted on a guide rail unit 90 in a linear direction, a spindle shaft 92 is rotatably mounted in the headstock 91, and a chuck member 93 for gripping a workpiece (W) is coupled to a right end of the spindle shaft 92 so as to rotate with the spindle shaft 92. In the conventional headstock assembly, the linear motion of the headstock 91 is driven by a drive member 94, and the rotary motion of the spindle shaft 92 is driven by another drive member (not shown).

SUMMARY

Therefore, an object of the disclosure is to provide a novel headstock assembly for a machine tool. With the provision of the headstock assembly, linear motion of a headstock and rotary motion of a spindle can be driven by the same drive member. In addition, the headstock assembly has a relatively simple structure and is easy to assemble.

According to a first aspect of the disclosure, a headstock assembly for a machine tool is provided. The machine tool is used for machining a workpiece, and includes a machine base, and a guide rail unit mounted on the machine base and extending along a longitudinal direction. The headstock assembly includes a mount, a headstock, a drive member, a spindle, and a spindle extension. The mount is secured to the machine base, and has a female threaded bore. The headstock is mounted slidably on the guide rail unit, and is spaced apart from the mount in the longitudinal direction. The drive member is mounted on the headstock. The spindle extends along a spindle axis in the longitudinal direction, and is rotatably mounted to the headstock. The spindle is coupled to be driven by the drive member to rotate about the spindle axis. The spindle extension extends along the spindle axis, and is coupled to be rotatable with the spindle. The spindle extension has a male threaded segment which is configured to be in threaded engagement with the female threaded bore so as to permit the headstock to be linearly moved relative to the mount in the longitudinal direction.

According to a second aspect of the disclosure, a headstock assembly for a machine tool is provided. The machine tool is used for machining a workpiece, and includes a machine base, and a guide rail unit mounted on the machine base and extending along a longitudinal direction. The headstock includes a headstock, a spindle, a chuck member, a drive member, a mount, and a spindle extension. The headstock is mounted slidably on the guide rail unit, and has a left end wall and a right end wall which is spaced apart from the left end wall in the longitudinal direction to define a chamber. The left end wall has a left inner bearing surface which defines a left bore extending to be communicated with the chamber. The right end wall has a right inner bearing surface which defines a right bore extending to be communicated with the chamber. The spindle extends along a spindle axis in the longitudinal direction to terminate at a left end and a right end, and has an intermediate segment, a left journal region, and a right journal region. The intermediate segment is disposed between the left and right ends in the chamber, and has a main region and a juncture region proximate to the right end. The left journal region is disposed between the left end and the main region, and is journaled on the left inner bearing surface. The right journal region is disposed between the right end and the juncture region, and is journaled on the right inner bearing surface. The chuck member for gripping the workpiece is coupled to the right end of the spindle so as to permit the chuck member to rotate with the spindle about the spindle axis. The drive member is mounted on the headstock and has an output shaft which is rotatable about a shaft axis, and which is coupled to the intermediate segment in the chamber so as to drive the spindle to rotate about the spindle axis. The mount is secured to the machine base and is disposed leftwardly of the guide rail unit. The mount has a female threaded bore extending along the spindle axis. The spindle extension extends along the spindle axis to terminate at a proximate end and a distal end. The proximate end is coupled to the left end of the spindle to permit the spindle extension to rotate with the spindle. The distal end is disposed leftwardly of the mount. The spindle extension has a male threaded segment which is disposed between the proximate and distal ends, and which is configured to be in threaded engagement with the female threaded bore so as to permit the headstock to be linearly moved relative to the mount in the longitudinal direction.

BRIEF DESCRIPTION OF THE DRAWINGS

Other features and advantages of the disclosure will become apparent in the following detailed description of the embodiments with reference to the accompanying drawings, in which.

DETAILED DESCRIPTION

Before the disclosure is described in greater detail, it should be noted that where considered appropriate, reference numerals have been repeated among the figures to indicate corresponding or analogous elements, which may optionally have similar characteristics.

With reference to FIGS. 2 to 5, a headstock assembly for a machine tool according to a first embodiment of the disclosure is shown. The machine tool is used for machining a workpiece (W) (only shown in FIG. 4), and includes a machine base 100 and a guide rail unit 90 which is mounted on the machine base 100, and which extends along a longitudinal direction (X).

The headstock assembly includes a mount 10, a headstock 20, a drive member 30, a spindle 40, a chuck member 50 for gripping the workpiece (W), and a spindle extension 60.

Figure 4:
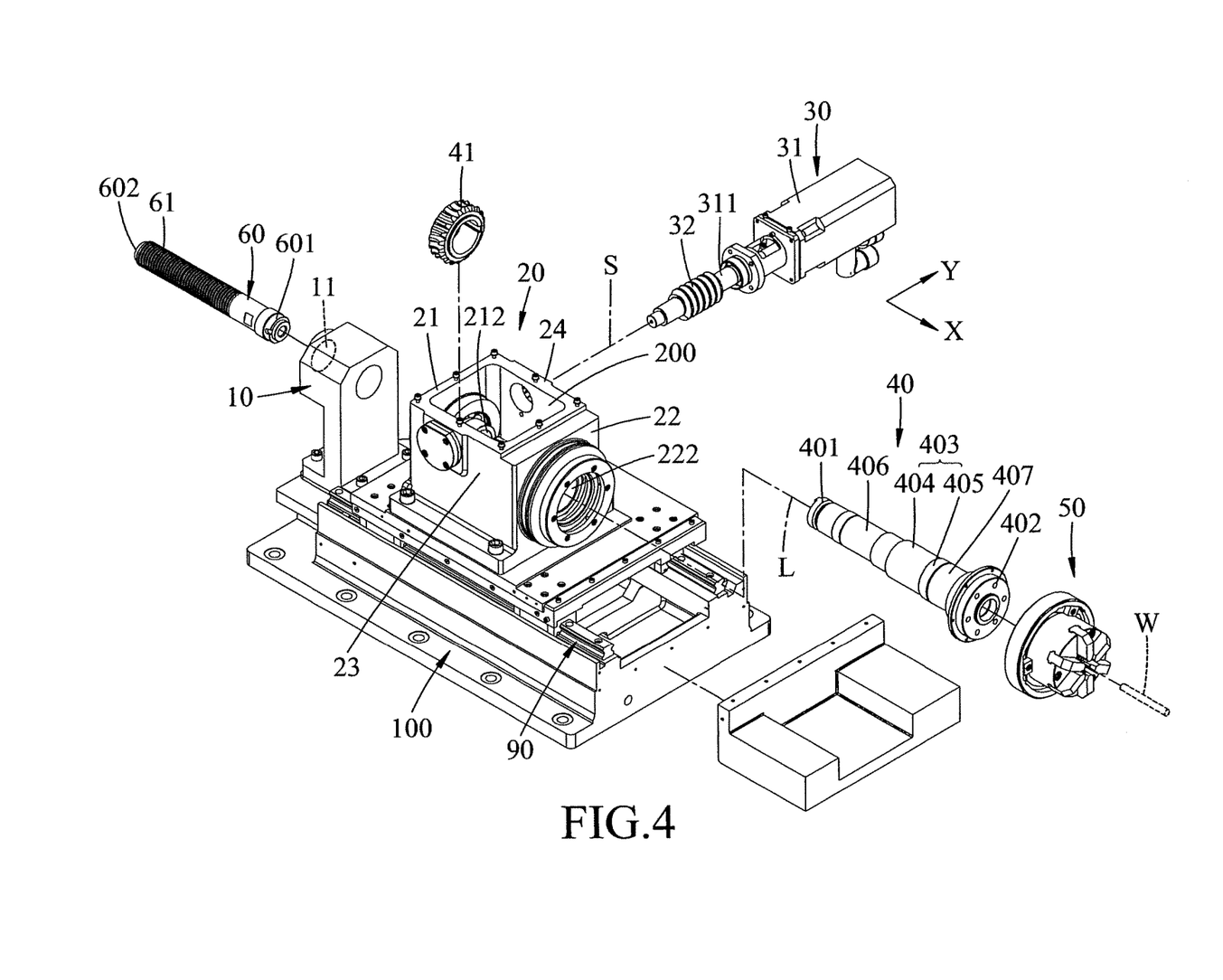
FIG. 4 is a partially exploded perspective view of the headstock assembly.
Figure 5:
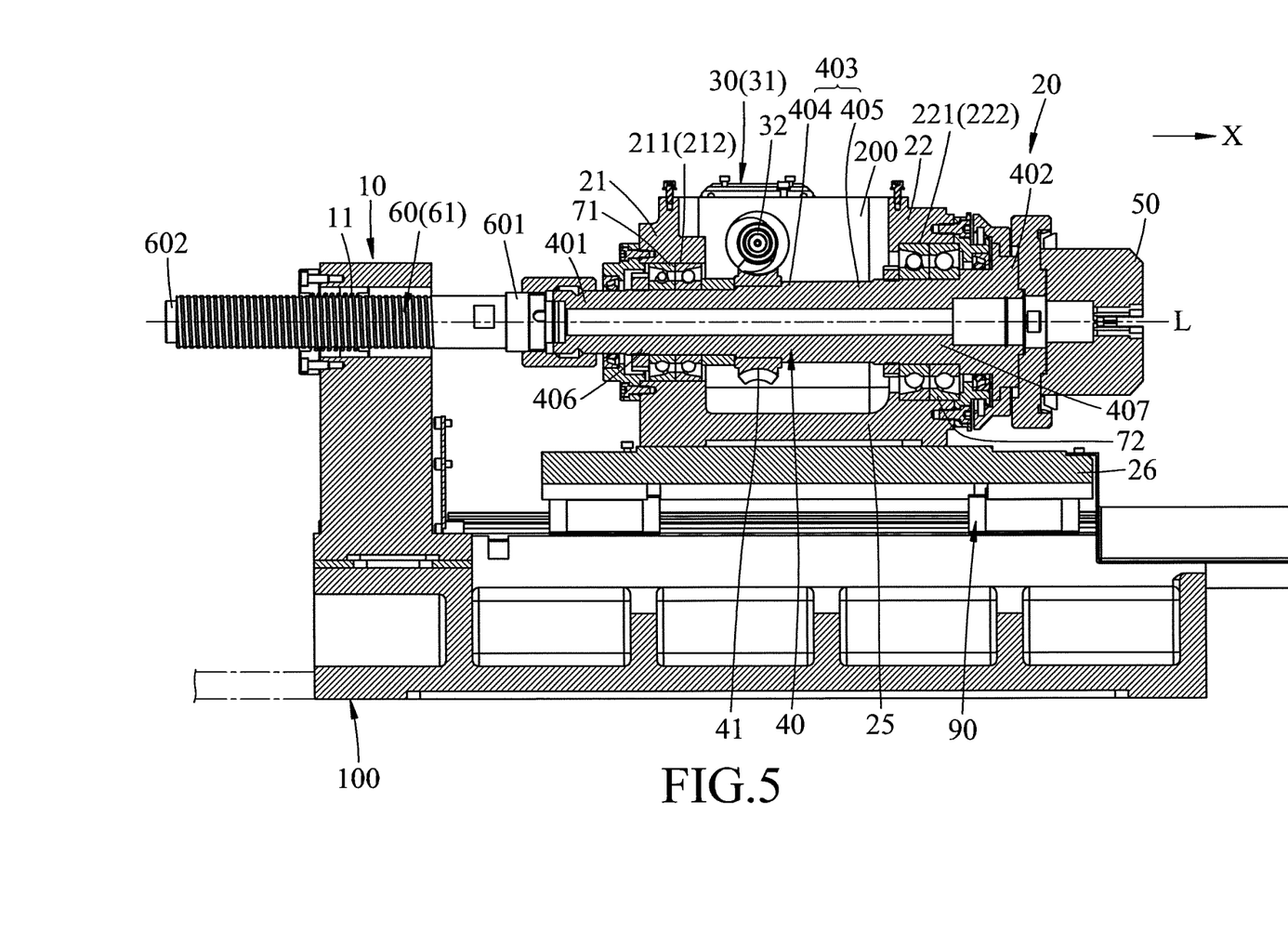
FIG. 5 is a partial cross-sectional view of the headstock assembly.

The mount 10 is secured to the machine base 100, and has a female threaded bore 11 (see FIGS. 4 and 5). In this embodiment, the mount 10 is disposed leftwardly of the guide rail unit 90, and the female threaded bore 11 extends along a spindle axis (L) in the longitudinal direction (X).

The headstock 20 is mounted slidably on the guide rail unit 90, and is spaced apart from the mount 10 in the longitudinal direction (X).

In this embodiment, the headstock 20 has a left end wall 21, a right end wall 22, a front end wall 23, a rear end wall 24, and a bottom wall 25, and defines therein a chamber 200. The right end wall 22 is spaced apart from the left end wall 21 in the longitudinal direction (X) to define the chamber 200. The rear end wall 24 is spaced apart from and is opposite to the front end wall 23 in a transverse direction (Y) relative to the longitudinal direction (X). As shown in FIG. 5, the left end wall 21 has a left inner bearing surface 211 which defines a left bore 212 extending to be communicated with the chamber 200. The right end wall 22 has a right inner bearing surface 221 which defines a right bore 222 extending to be communicated with the chamber 200.

Furthermore, the bottom wall 25 of the headstock 20 is secured on a platform 26 which is slidably mounted on the guided rail unit 90.

The spindle 40 extends along the spindle axis (L) in the longitudinal direction (X), and is rotatably mounted to the headstock 20. The spindle 40 is coupled to be driven by the drive member 30 to rotate about the spindle axis (L).

As shown in FIG. 5, the spindle 40 extends along the spindle axis (L) to terminate at a left end 401 and a right end 402, and has an intermediate segment 403, a left journal region 406, and a right journal region 407. The intermediate segment 403 is disposed between the left and right ends 401, 402 in the chamber 200, and has a main region 404 and a juncture region 405 proximate to the right end 402. The left journal region 406 is disposed between the left end 401 and the main region 404, and is journaled on the left inner bearing surface 211. The right journal region 407 is disposed between the right end 402 and the juncture region 405, and is journaled on the right inner bearing surface 221. Moreover, the spindle 40 is in the form of a tube.

The chuck member 50 is coupled to the right end 402 of the spindle 40 so as to permit the chuck member 50 to rotate with the spindle 40 about the spindle axis (L), to thereby allow rotation of the workpiece (W) relative to a tool (not shown).

Referring back to FIGS. 2 and 4, it can be seen that the drive member 30 is mounted on the headstock 20 and has an output shaft 311 which is rotatable about a shaft axis (S), and which is coupled to the intermediate segment 403 in the chamber 200 so as to drive the spindle 40 to rotate about the spindle axis (L).

In this embodiment, the shaft axis (S) extends in the transverse direction (Y), the drive member 30 has a motor body 31 secured on an outer surface of the rear end wall 24, and the output shaft 311 extends from the motor body 31 through the rear end wall 24 and the chamber 200 so as to be rotatably mounted to the front end wall 23.

The spindle extension 60 extends along the spindle axis (L), and is coupled to be rotatable with the spindle 40. The spindle extension 60 has a male threaded segment 61 which is configured to be in threaded engagement with the female threaded bore 11 so as to permit the headstock 20 to be linearly moved relative to the mount 10 in the longitudinal direction (L).

In this embodiment, the spindle extension 60 extends along the spindle axis (L) to terminate at a proximate end 601 and a distal end 602. The proximate end 601 is coupled to the left end 401 of the spindle 40 to permit the spindle extension 60 to rotate with the spindle 40. The distal end 602 is opposite to the proximate end 601 in the longitudinal direction (X) and is disposed leftwardly of the mount 10. The male threaded segment 61 is disposed between the proximate and distal ends 601, 602.

In this embodiment, the headstock assembly further includes a left anti-friction member 71, a right anti-friction member 72, a tubular worm 32, and a worm gear 41.

As best shown in FIG. 5, the left anti-friction member 71 is disposed between the left journal region 406 and the left inner bearing surface 211. The right anti-friction member 72 is disposed between the right journal region 407 and the right inner bearing surface 221.

Referring back to FIGS. 2 and 4, it can be observed that the tubular worm 32 is sleeved and mounted on the output shaft 311 to permit the tubular worm 32 to rotate with the output shaft 311 about the shaft axis (S). As shown in FIG. 5, the worm gear 41 is mounted on the main region 404 of the intermediate segment 403 of the spindle 40, and is configured to mesh with the tubular worm 32 so as to permit the worm gear 41, together with the spindle 40, to be driven to rotate about the spindle axis (L).

In this embodiment, the machine tool is used for threading the workpiece (W). To produce a threaded member with desired pitch and outer dimension, the spindle extension 60 and the mount 10 may be replaced.

With the provision of the single drive member 30, the workpiece (W) can be driven to rotate about the spindle axis (L) and to slide in the longitudinal direction (X).

Figure 6:
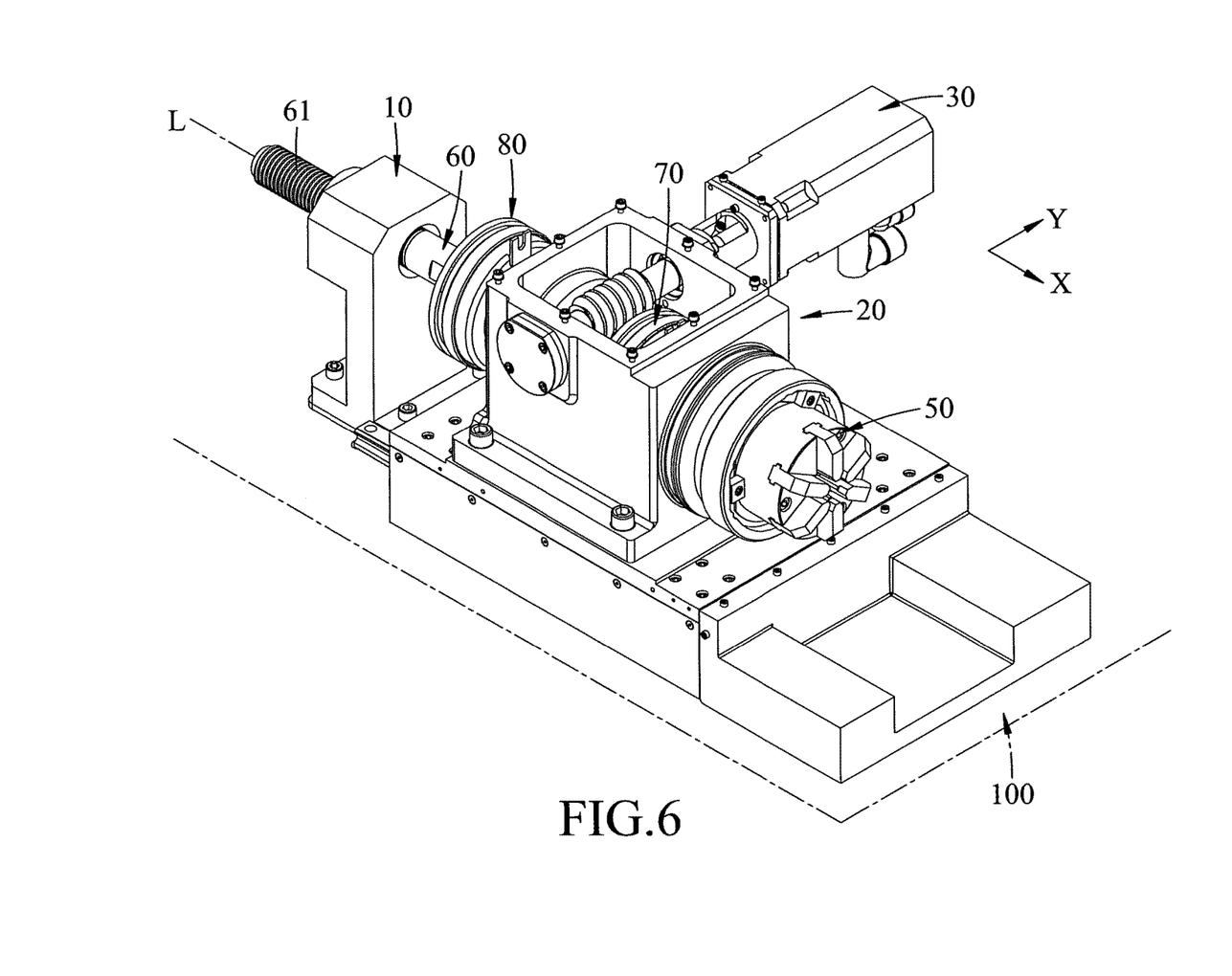
FIG. 6 is a perspective view of a headstock assembly for a machine tool according to a second embodiment of the disclosure.
Figure 7:
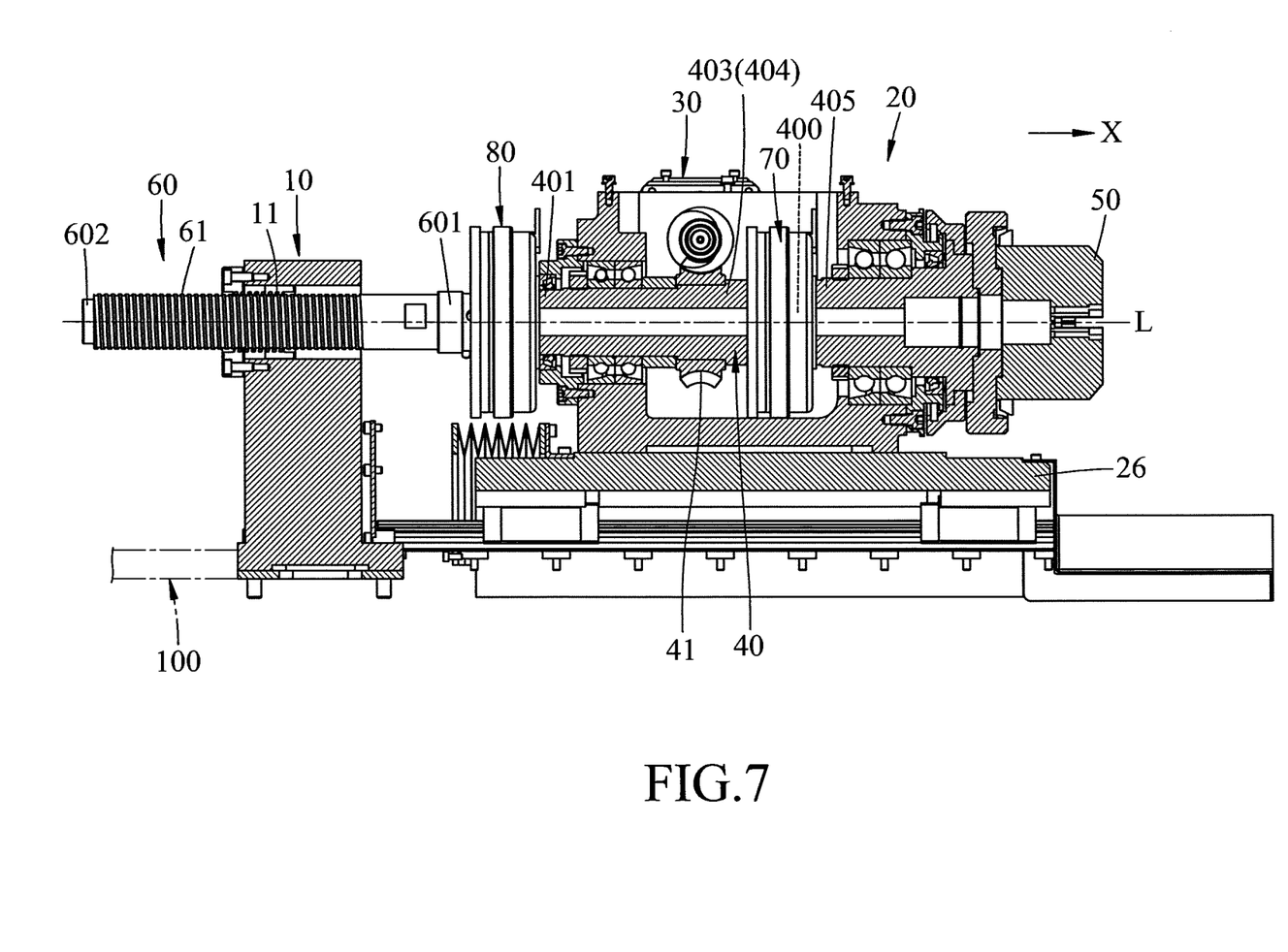
FIG. 7 is a partial cross-sectional view of the headstock assembly of FIG. 6.

FIGS. 6 and 7 illustrate a headstock assembly for a machine tool according to a second embodiment of the disclosure. The second embodiment is similar to the first embodiment except that the main region 404 and the juncture region 405 of the intermediate segment 403 of the spindle 40 are spaced apart in the longitudinal direction (X) by a gap 400.

In addition, in the second embodiment, the headstock assembly further includes a first electromagnetic clutch 70 and a second electromagnetic clutch 80.

The first electromagnetic clutch 70 is disposed to couple the main region 404 to the juncture region 405 of the intermediate segment 403 of the spindle 40 such that when the first electromagnetic clutch 70 is switched on, the juncture region 405 is permitted to be rotated with the main region 404, and such that when the first electromagnetic clutch 70 is switched off, the juncture region 405 is unable to rotate with the main region 404.

The second electromagnetic clutch 80 is disposed to couple the left end 401 of the spindle 40 to the proximate end 601 of the spindle extension 60 such that when the second electromagnetic clutch 80 is switched on, the spindle extension 60 is permitted to be rotated with the spindle 40, and such that when the second electromagnetic clutch 80 is switched off, the spindle extension 60 is unable to rotate with the spindle 40.

When both of the first and second electromagnetic clutches 70, 80 are switched on, the workpiece is driven to rotate and to move linearly relative to a tool, and the headstock assembly of the second embodiment can be used for threading a workpiece.

When the first electromagnetic clutch 70 is switched on and the second electromagnetic clutch 80 is switched off, the workpiece is merely driven to rotate relative to a tool. When the second electromagnetic clutch 80 is switched on and the first electromagnetic clutch 70 is switched off, the workpiece is merely driven to move linearly relative to a tool.

Figure 8:
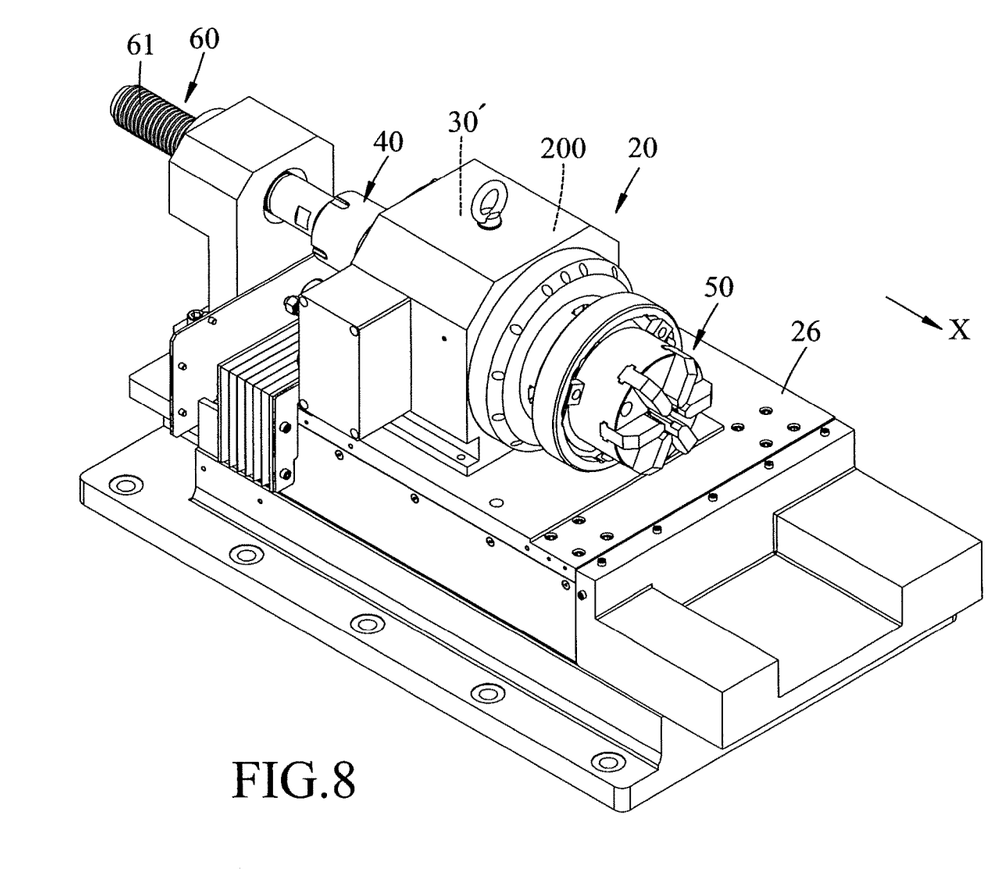
FIG. 8 is a perspective view of a headstock assembly for a machine tool according to a third embodiment of the disclosure.
Figure 9:
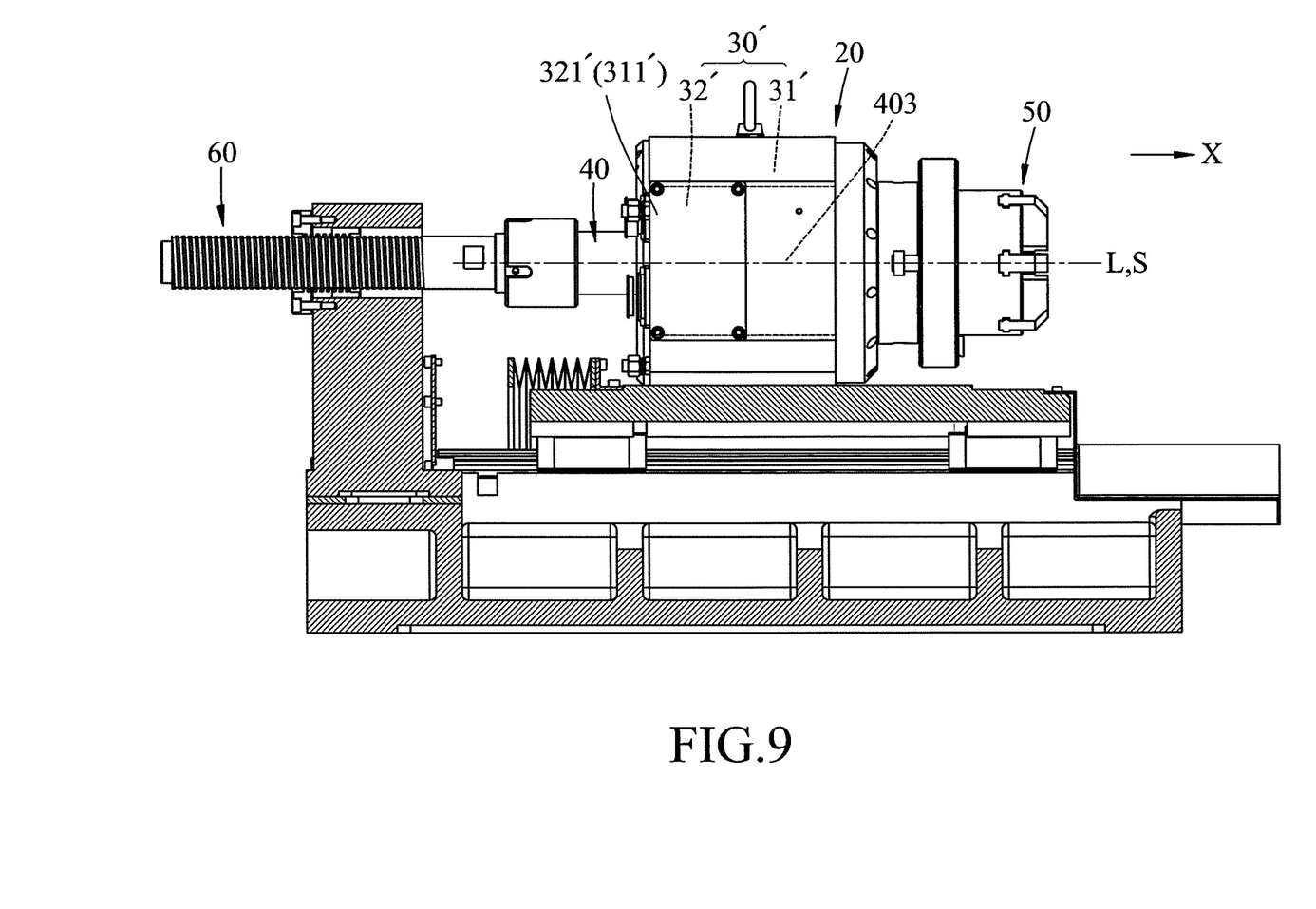
FIG. 9 is a partial cross-sectional view of the headstock assembly of FIG. 8.

FIGS. 8 and 9 illustrate a headstock assembly for a machine tool according to a third embodiment of the disclosure. The third embodiment is similar to the first embodiment except that the drive member 30 is replaced by a drive member 30'. The drive member 30' is disposed in the chamber 200, and has a stator 31' and a rotor 32'. The stator 31' is configured to surround the spindle 40. The rotor 32' extends in the longitudinal direction (X) to terminate a rotor end 321' that serves as the output shaft 311', and is coaxially and integrally formed with the intermediate segment 403 of the spindle 40.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A headstock assembly for a machine tool which is used for machining a workpiece, and which includes a machine base, and a guide rail unit mounted on the machine base and extending along a longitudinal direction, said headstock assembly comprising:
   a mount secured to the machine base, and having a female threaded bore;
   a headstock which is mounted slidably on the guide rail unit, and which is spaced apart from said mount in the longitudinal direction;
   a drive member mounted on said headstock;
   a spindle which extends along a spindle axis in the longitudinal direction, and which is rotatably mounted to said headstock, said spindle being coupled to be driven by said drive member to rotate about the spindle axis; and
   a spindle extension extending along the spindle axis, and coupled to be rotatable with said spindle, said spindle extension having a male threaded segment which is configured to be in threaded engagement with said female threaded bore so as to permit said headstock to be linearly moved relative to said mount in the longitudinal direction, wherein said headstock has a left end wall and a right end wall which is spaced apart from said left end wall in the longitudinal direction to define a chamber, said left end wall having a left inner bearing surface which defines a left bore extending to be communicated with said chamber, said right end wall having a right inner bearing surface which defines a right bore extending to be communicated with said chamber,
   said spindle extends along the spindle axis to terminate at a left end and a right end, and has
      an intermediate segment disposed between said left and right ends in said chamber, and having a main region and a juncture region proximate to said right end,
      a left journal region which is disposed between said left end and said main region, and which is journaled on said left inner bearing surface, and
      a right journal region which is disposed between said right end and said juncture region, and which is journaled on said right inner bearing surface,
   said drive member has an output shaft which is rotatable about a shaft axis, and which is coupled to said intermediate segment in said chamber so as to drive said spindle to rotate about the spindle axis,
   said mount is disposed leftwardly of the guide rail unit, and said female threaded bore extends along the spindle axis, and
   said spindle extension extends along the spindle axis to terminate at a proximate end which is coupled to said left end of said spindle to permit said spindle extension to rotate with said spindle, and a distal end opposite to said proximate end in the longitudinal direction, said male threaded segment being disposed between said proximate and distal ends.

2. The headstock assembly according to claim 1, further comprising:
   a chuck member for gripping the workpiece, which is coupled to said right end of said spindle so as to permit said chuck member to rotate with said spindle about the spindle axis.

3. The headstock assembly according to claim 1, further comprising:
   a left anti-friction member disposed between said left journal region and said left inner bearing surface, and
   a right anti-friction member disposed between said right journal region and said right inner bearing surface.

4. The headstock assembly according to claim 1, wherein the shaft axis extends in a transverse direction relative to the longitudinal direction, said headstock assembly further comprising:
   a tubular worm sleeved and mounted on said output shaft to permit said tubular worm to rotate with said output shaft about the shaft axis, and
   a worm gear which is mounted on said main region of said intermediate segment of said spindle, and which is configured to mesh with said tubular worm so as to permit said worm gear, together with said spindle, to be driven to rotate about the spindle axis.

5. The headstock assembly according to claim 4, wherein said headstock further has a front end wall and a rear end wall opposite to said front end wall in the transverse direction, said drive member having a motor body secured on an outer surface of said rear end wall, said output shaft extending from said motor body through said rear end wall and said chamber so as to be rotatably mounted to said front end wall.

6. The headstock assembly according to claim 1, wherein said main region and said juncture region are spaced apart in the longitudinal direction by a gap, said headstock assembly further comprising:
   a first electromagnetic clutch disposed to couple said main region to said juncture region of said intermediate segment of said spindle such that when said first electromagnetic clutch is switched on, said juncture region is permitted to be rotated with said main region, and such that when said first electromagnetic clutch is switched off, said juncture region is unable to rotate with said main region.

7. The headstock assembly according to claim 1, further comprising:
   a second electromagnetic clutch which is disposed to couple said left end of said spindle to said proximate end of said spindle extension such that when said second electromagnetic clutch is switched on, said spindle extension is permitted to be rotated with said spindle, and such that when said second electromagnetic clutch is switched off, said spindle extension is unable to rotate with said spindle.

8. The headstock assembly according to claim 1, wherein said drive member is disposed in said chamber, and has a stator configured to surround said spindle, and a rotor which extends in the longitudinal direction to terminate at a rotor end that serves as said output shaft, and which is coaxially and integrally formed with said intermediate segment of said spindle.

9. A headstock assembly for a machine tool which is used for machining a workpiece, and which includes a machine base, and a guide rail unit mounted on the machine base and extending along a longitudinal direction, said headstock assembly comprising:
   a headstock which is mounted slidably on the guide rail unit, and which has a left end wall and a right end wall which is spaced apart from said left end wall in the longitudinal direction to define a chamber, said left end wall having a left inner bearing surface which defines a left bore extending to be communicated with said chamber, said right end wall having a right inner bearing surface which defines a right bore extending to be communicated with said chamber;
   a spindle which extends along a spindle axis in the longitudinal direction to terminate at a left end and a right end, and which has
      an intermediate segment disposed between said left and right ends in said chamber, and having a main region and a juncture region proximate to said right end,
      a left journal region which is disposed between said left end and said main region, and which is journaled on said left inner bearing surface, and
      a right journal region which is disposed between said right end and said juncture region, and which is journaled on said right inner bearing surface;
   a chuck member for gripping the workpiece, which is coupled to said right end of said spindle so as to permit said chuck member to rotate with said spindle about the spindle axis;
   a drive member mounted on said headstock and having an output shaft which is rotatable about a shaft axis, and which is coupled to said intermediate segment in said chamber so as to drive said spindle to rotate about the spindle axis;
   a mount secured to the machine base and disposed leftwardly of the guide rail unit, said mount having a female threaded bore extending along the spindle axis; and
   a spindle extension extending along the spindle axis to terminate at a proximate end which is coupled to said left end of said spindle to permit said spindle extension to rotate with said spindle, and a distal end disposed leftwardly of said mount, said spindle extension having a male threaded segment which is disposed between said proximate and distal ends, and which is configured to be in threaded engagement with said female threaded bore so as to permit said headstock to be linearly moved relative to said mount in the longitudinal direction.

* * * * *